United States Patent
Pailler et al.

(10) Patent No.: US 11,697,438 B2
(45) Date of Patent: Jul. 11, 2023

(54) EMERGENCY EXIT WINDOW FOR A PUBLIC TRANSPORT VEHICLE

(71) Applicant: SpeedInnov, Paris (FR)

(72) Inventors: Christophe Pailler, Perigny (FR); Bastian Simoni, Nogent sur Marne (FR)

(73) Assignee: SpeedInnov, Paris (FR)

( * ) Notice: Subject to any disclaimer, the term of this patent is extended or adjusted under 35 U.S.C. 154(b) by 154 days.

(21) Appl. No.: 16/991,749

(22) Filed: Aug. 12, 2020

(65) Prior Publication Data

US 2021/0046957 A1  Feb. 18, 2021

(30) Foreign Application Priority Data

Aug. 12, 2019  (FR) ..................... 19 09152

(51) Int. Cl.
*B61D 25/00* (2006.01)

(52) U.S. Cl.
CPC .................... *B61D 25/00* (2013.01)

(58) Field of Classification Search
CPC .......... B61D 25/00; B61D 19/023; B60J 3/04; B60J 1/10; B60J 9/02; B32B 17/10036
See application file for complete search history.

(56) References Cited

U.S. PATENT DOCUMENTS

| 5,350,613 A * | 9/1994 | Deprez | ............. B32B 17/10036 428/137 |
| 2016/0161780 A1* | 6/2016 | Van Oosten | ............... E06B 9/24 349/16 |
| 2018/0079181 A1 | 3/2018 | Gastal | |

FOREIGN PATENT DOCUMENTS

| CN | 202953942 U | 5/2013 | |
| DE | 101 19 315 C1 | 7/2002 | |
| DE | 10139959 A1 * | 3/2003 | ....... B32B 17/10036 |
| DE | 10 2015 001 350 A1 | 8/2016 | |
| DE | 20 2016 106808 U1 | 5/2017 | |
| EP | 0 679 793 A2 | 11/1995 | |
| EP | 0 679 793 A3 | 11/1995 | |
| EP | 1 500 537 A1 | 1/2005 | |
| GB | 2280925 A * | 2/1995 | ....... B32B 17/10036 |
| WO | 01/98079 A1 | 12/2001 | |
| WO | WO-2008010002 A1 * | 1/2008 | ....... B32B 17/10036 |
| WO | 2014/121809 A1 | 8/2014 | |

OTHER PUBLICATIONS

Clera document—Clera Windows + Doors Blog (Year: 2012).*
Rapport De Recherche Préliminarie issued in corresponding French Patent Application No. 19 09152 dated Mar. 30, 2020 (Mar. 30, 2020).

* cited by examiner

*Primary Examiner* — Mark T Le
(74) *Attorney, Agent, or Firm* — Troutman Pepper Hamilton Sanders LLP

(57) ABSTRACT

An emergency exit window for a public transport vehicle, comprising a pane, characterized in that the pane comprises at least one first zone with variable opaqueness, at least one second breakable zone, which may be broken in order to allow the passage of people through the window, and at least one third transparent or translucent zone with fixed opaqueness and withstanding breaking of the pane.

11 Claims, 2 Drawing Sheets

EMERGENCY EXIT WINDOW FOR A PUBLIC TRANSPORT VEHICLE

CROSS REFERENCE TO RELATED APPLICATION

This application claims priority of French Patent Application No. 19 09152, filed Aug. 12, 2019. The entire contents of which are hereby incorporated by reference.

FIELD OF THE INVENTION

The present invention relates to an emergency exit window for a public transport vehicle.

BACKGROUND

It is common, or even mandatory in some cases where standards apply, to equip public transport vehicles with emergency exit windows.

Known emergency exit windows comprise an untearable and impassable central zone and a breakable peripheral zone.

In case of emergency, such windows can be broken without danger by striking the peripheral zone, and expelled toward the outside by the users of a vehicle to thus make it possible to evacuate the vehicle.

However, such emergency exit windows are not fully satisfactory. Indeed, aside from the function specific to a window of allowing users to see through it, they serve only as emergency exits.

SUMMARY

The invention in particular aims to improve emergency exit windows by proposing an emergency exit window combining a plurality of functions favoring user comfort while guaranteeing user safety.

To that end, the invention relates to an emergency exit window for a public transport vehicle, comprising a pane, characterized in that the pane comprises:
  at least one first zone with variable opaqueness,
  at least one second breakable zone, which may be broken in order to allow the passage of people through the window, and
  at least one third transparent or translucent zone with fixed opaqueness and withstanding breaking of the pane.

A window according to the invention may further include one or more of the following features, considered alone or according to any technically possible combinations:
  the first zone extends over at least 70% of the pane;
  the second zone extends on the periphery of the first zone, and the third zone extends on the periphery of the second zone;
  the first zone of the pane includes a film of electro-controlled variable opaqueness, in particular of the suspended particle device (SPD) type, the opaqueness of the first zone of the pane being able to be switched from the opaque state to the transparent state by application of a first electric voltage between two opposite faces of said film, and able to be switched from the transparent state to the opaque state by application of a second electric voltage, separate from the first voltage, to said film;
  the third zone of the pane comprises a laminated glass formed by at least two superimposed sheets of glass and an intermediate film arranged between two successive superimposed sheets of the laminated glass;
  the second zone of the pane comprises a laminated glass formed by at least two superimposed sheets of glass, the second zone being devoid of intermediate film arranged between two successive superimposed sheets of the laminated glass;
  the intermediate film is made from polyvinyl butyral (PVB);
  the second zone of the pane has at least one point of least resistance, making it possible to initiate breaking of the pane in order to allow the passage of people through the window;
  the window extends along a main longitudinal direction and has a defined length in that direction, and wherein the point of least resistance is arranged substantially halfway along the length of the window.

The present invention also relates to a public transport vehicle comprising such an emergency exit window.

BRIEF DESCRIPTION OF THE DRAWINGS

The invention will be better understood upon reading the following description, provided solely as an example and done in reference to the appended figures, in which.

DETAILED DESCRIPTION OF THE DRAWINGS

In the following description, the terms "outer," "inner," "top," "bottom" are to be understood in reference to the usual direction of rail vehicles.

Figure 1:
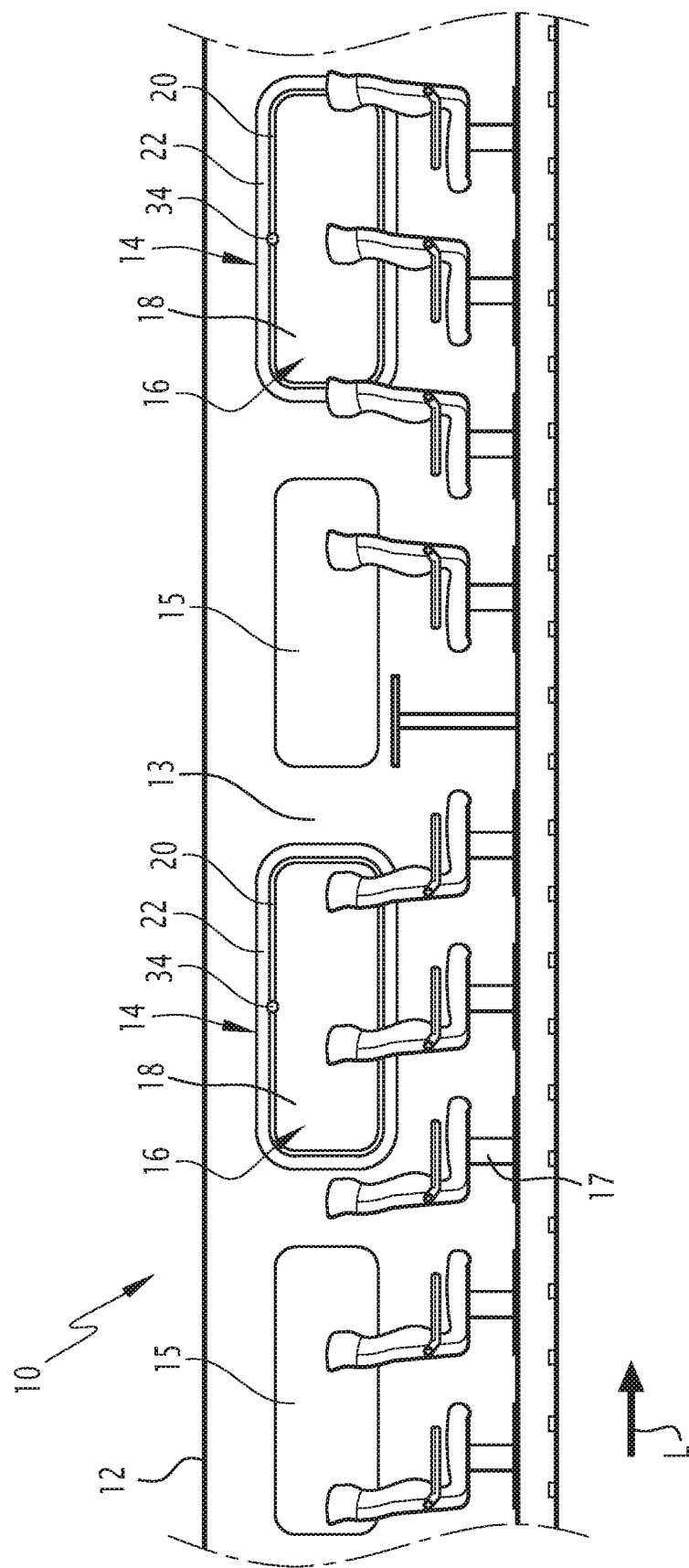
FIG. 1 schematically shows a longitudinal sectional view of a public transport vehicle comprising windows according to one exemplary embodiment of the invention.

FIG. 1 partially shows a public transport vehicle 10. For example, the public transport vehicle 10 is a rail vehicle.

The rail vehicle 10 comprises at least one body 12 comprising two side walls 13 (one of which is shown in FIG. 1). The rail vehicle 10 extends along a main longitudinal direction L. The side wall 13 comprises at least one window 14, 15, generally a plurality of windows 14, 15.

Preferably, the vehicle 10 comprises a plurality of seats 17.

In FIG. 1, two of the four seats 14, 15 are emergency exit windows 14. In a variant, all of the windows are emergency exit windows 14.

Each emergency exit window 14 comprises a pane 16.

The pane 16 comprises a first zone 18 of variable opaqueness, a second breakable zone 20, which can be broken in order to allow the passage of people, and a third zone 22 that withstands breaking and is translucent or transparent with fixed opaqueness.

The opaqueness of the first zone 18 of the pane 16 is adjustable between a transparent state and an opaque state with respect to light. Here, "transparent to light" refers to a state in which the first zone 18 of the pane 16 is transparent or quasi-transparent for light waves in the visible domain, for example has a transmission factor between 35% and 45%. Furthermore, "opaque to light" refers to a state in which the first zone 18 of the pane 16 is opaque or quasi-opaque for light waves in the visible domain, for example has a transmission factor between 0% and 5%.

Figure 2:
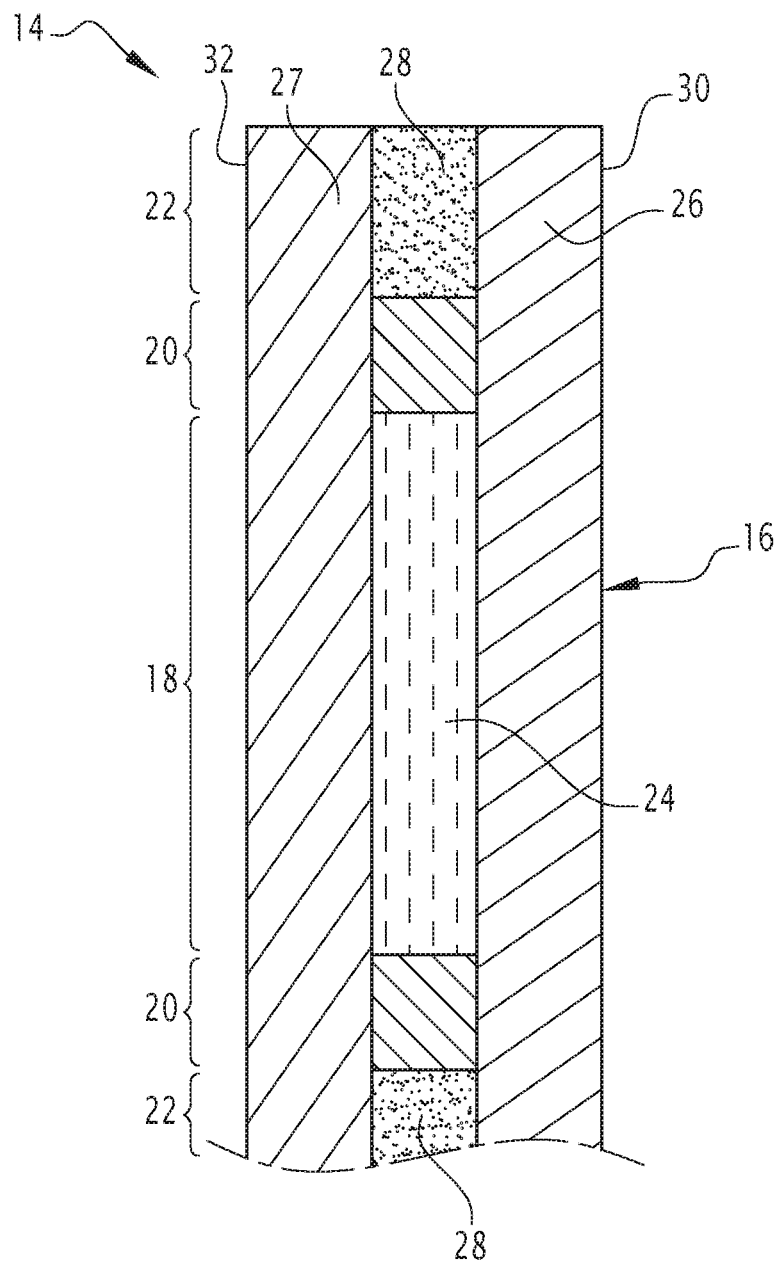
FIG. 2 schematically shows a cross-sectional view of a window of the vehicle of FIG. 1.

According to one advantageous embodiment of the invention, the first zone 18 of the pane 16 comprises an electro-controlled film of variable opaqueness 24 (visible in FIG. 2).

The film of variable opaqueness 24 is in particular of the suspended particle device (SPD) type, or other films having a variable opaqueness.

The opaqueness of the variable opaqueness film 24 varies as a function of a voltage applied between the two faces of this film 24. The electric voltage applied to the variable opaqueness film 24 is for example provided by a low voltage grid of the rail vehicle, and applied using two conductive films (not shown) arranged on either side of the variable opaqueness film 24 and in contact with the latter.

For example, the opaqueness of the first zone 18 of the pane 16 can be switched from the opaque state to the transparent state by applying a first predefined electric voltage to the variable opaqueness film 24, and can be switched from the transparent state to the opaque state by applying a second electric voltage, for example a nil voltage, to the variable opaqueness film 24.

Advantageously, the opaqueness of the first zone 18 of the pane 16 is also adjustable between a plurality of partially opaque states by varying the voltage applied to the variable opaqueness film 24 between the first and the second electric voltages.

The first zone 18 of the pane 16 for example comprises a laminated glass.

The laminated glass comprises an outer sheet of glass 26 and an inner sheet of glass 27 that are arranged on either side of the variable opaqueness film 24.

Preferably, the first zone 18 of the pane 16 extends over at least 70% of the pane 16. Still more preferably, the first zone 18 of the pane 16 extends over at least 80% of the pane 16. The first zone of the pane 16 is centered on the pane 16.

Likewise, a user can vary the opaqueness of the first zone 18 of the pane 16 as desired.

The first zone 18 of the pane 16 is unbreakable; it cannot be crossed if the window 14 is broken.

The third zone 22 of the pane 16 for example comprises the outer sheet of glass 26, the inner sheet of glass 27 and an intermediate film 28.

The outer sheet of glass 26 defines an outer surface 30 and the inner sheet of glass 27 defines an inner surface 32.

The intermediate film 28 is inserted between the outer 26 and inner 27 sheets of glass.

The intermediate film 28 is generally a film intended to ensure the mechanical integrity of the outer sheet of glass 26, in particular in case of impact. The intermediate film 28 is for example made from polyvinyl butyral.

Thus, the third zone 22 of the pane 16 is unbreakable; it cannot be crossed if the window 14 is broken.

In a variant, the laminated glass comprises at least three sheets of glass, and a plurality of intermediate films, each intermediate film being arranged between two successive sheets of glass.

The third zone 22 of the pane 16 is devoid of variable opaqueness film.

Preferably, the third zone 22 of the pane 16 extends over 10% to 20% of the pane 16.

The second zone 20 of the pane 16 is arranged between the first zone 18 and the third zone 22 of the pane 16 such that the second zone 20 surrounds the first zone 18, and the third zone 22 surrounds the second zone 20.

In other words, the second zone 20 extends on the periphery of the first zone 18, and the third zone 22 extends on the periphery of the second zone 20.

Preferably, the second zone 20 of the pane 16 extends over 5% to 10% of the pane 16.

The second zone 20 of the pane 16 for example comprises the outer sheet of glass 26 and the inner sheet of glass 27.

The second zone 20 of the pane 16 is devoid of intermediate film 28 and variable opaqueness film 24.

In this way, the second zone 20 of the pane 16 constitutes a weak zone of the pane 16 that can be broken in case of emergency.

Advantageously, the emergency exit window 14 also comprises a point of least resistance 34.

Preferably, the pane comprises a mark at the point of least resistance, making it possible to visually indicate a location to a user at which to strike the pane 16 using a hammer for breaking glass in case of emergency.

The point of least resistance 34 is arranged in the second zone 20 of the pane 16. In this way, the point of least resistance 34 indicates to the user to strike the breakable zone of the pane 16.

Preferably, the point of least resistance 34 is arranged substantially halfway along the length of the pane 16 defined along the longitudinal direction L on the upper part of the pane 16. In this way, the accessibility of the point of least resistance 34 is optimal.

During normal operation, the three zones of the pane 18, 20, 22 are secured to one another.

An evacuation of the public transport vehicle 10 using the emergency exit window 14 according to the invention will now be described.

A user strikes the pane 16 at the point of least resistance 34 in order to initiate breaking of the pane.

As the user strikes, the pane 16 cracks along the second zone of the pane 20 in order to separate the first zone 18 from the third zone 22, both of which withstand breaking. The user next pushes the pane 16 outward and can evacuate the vehicle.

Thus, the window according to the invention offers both the emergency exit function allowing passengers to leave the vehicle in case of emergency, and the comfort of a window with variable opaqueness making it possible to adjust the brightness in the vehicle as a function of the outside brightness and/or based on the desires of the passengers and their activities.

The window according to the invention further makes it possible to homogenize a room of a public transport vehicle compared with a vehicle comprising emergency exit windows and variable opaqueness windows separate from the emergency exit windows.

The invention claimed is:

1. An emergency exit window for a public transport vehicle, comprising a pane, wherein the pane comprises:
    at least one first zone with variable opaqueness, the first zone of the pane comprising a laminated glass comprising an outer sheet of glass and an inner sheet of glass that are arranged on either side of a film of variable opaqueness,
    at least one second breakable zone, which may be broken in order to allow passage of people through the window, the second zone of the pane comprising a laminated glass formed by at least two superimposed sheets of glass, the second zone being devoid of intermediate film arranged between two successive superimposed sheets of the laminated glass, and
    at least one third transparent or translucent zone with fixed opaqueness and withstanding breaking of the pane, the third zone of the pane comprising a laminated glass formed by at least two superimposed sheets of glass and an intermediate film arranged between two successive superimposed sheets of the laminated glass.

2. The emergency exit window according to claim 1, wherein the first zone extends over at least 70% of the pane.

3. The emergency exit window according to claim 1, the second zone extends on the periphery of the first zone, and the third zone extends on the periphery of the second zone.

4. The emergency exit window according to claim 1, wherein the first zone of the pane includes a film of electro-controlled variable opaqueness, in particular with suspended particles, the opaqueness of the first zone of the pane being able to be switched from an opaque state to a transparent state by application of a first electric voltage between two opposite faces of said film, and able to be switched from the transparent state to the opaque state by application of a second electric voltage, separate from the first voltage, to said film.

5. The emergency exit window according to claim 1, wherein the intermediate film is made from polyvinyl butyral.

6. The emergency exit window according to claim 1, wherein the second zone of the pane has at least one point of least resistance, making it possible to initiate breaking of the pane in order to allow the passage of people through the window.

7. The emergency exit window according to claim 6, extending along a main longitudinal direction and has a defined length in that direction, and wherein the point of least resistance is arranged substantially halfway along the length of the window.

8. A public transport vehicle comprising at least one emergency exit window according to claim 1.

9. The emergency exit window according to claim 1, wherein the second zone of the pane extends over 5% to 10% of the pane.

10. The emergency exit window according to claim 1, wherein the third zone of the pane extends over 10% to 20% of the pane.

11. The emergency exit window according to claim 1, wherein the first zone of the pane withstands breaking of the pane.

\* \* \* \* \*